(12) United States Patent
Maffe' et al.

(10) Patent No.: US 11,358,667 B2
(45) Date of Patent: Jun. 14, 2022

(54) SAFETY WINDSCREEN ASSEMBLY

(71) Applicant: PIAGGIO & C. SPA, Pontedera (IT)

(72) Inventors: Francesco Maffe', Pontedera (IT); Stefano Baracco, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 218 days.

(21) Appl. No.: 16/769,769

(22) PCT Filed: Dec. 4, 2018

(86) PCT No.: PCT/IB2018/059605
§ 371 (c)(1),
(2) Date: Jun. 4, 2020

(87) PCT Pub. No.: WO2019/116158
PCT Pub. Date: Jun. 20, 2019

(65) Prior Publication Data
US 2020/0298924 A1   Sep. 24, 2020

(30) Foreign Application Priority Data
Dec. 15, 2017   (IT) ........................ 102017000145180

(51) Int. Cl.
*B62J 17/04* (2006.01)
*B62J 27/00* (2020.01)

(52) U.S. Cl.
CPC ............... *B62J 17/04* (2013.01); *B62J 27/00* (2013.01)

(58) Field of Classification Search
CPC .................................. B62J 17/04; B62J 27/00
See application file for complete search history.

(56) References Cited

U.S. PATENT DOCUMENTS

| 4,379,584 A * | 4/1983 | Willey | .................. B62K 19/48 |
| | | | 296/78.1 |
| 5,855,404 A * | 1/1999 | Saunders | ................. B62J 17/04 |
| | | | 296/180.1 |
| 7,458,626 B1 * | 12/2008 | Stadnyk | ................... B62J 17/04 |
| | | | 296/78.1 |

(Continued)

FOREIGN PATENT DOCUMENTS

| DE | 2629731 A1 | 1/1978 |
| DE | 102019102530 A1 * | 8/2020 |

OTHER PUBLICATIONS

International Search Report for corresponding application PCT/IB2018/059605 filed Dec. 4, 2018; dated Feb. 22, 2019.

*Primary Examiner* — D Glenn Dayoan
*Assistant Examiner* — Melissa Ann Bonifazi
(74) *Attorney, Agent, or Firm* — Cantor Colburn LLP

(57) ABSTRACT

A safety windscreen assembly including a windscreen panel, a support arm to support the windscreen panel, the support arm having a first arm portion configured to be attached to a motor vehicle, and a second arm portion attached to the windscreen panel, the motor vehicle being a vehicle provided with a steering handlebar and with a seat astride which a driver may sit, where at least one sacrificial coupling element is provided, to couple the second arm portion with the first arm portion so that the second arm portion is adapted to pass in a breaking configuration with respect to the first arm portion when the windscreen panel is hit by a predetermined impact force higher than a threshold value.

8 Claims, 5 Drawing Sheets

(56) References Cited

U.S. PATENT DOCUMENTS

| | | | | |
|---|---|---|---|---|
| 9,580,127 B1* | 2/2017 | Stadnyk | .................... | B62J 17/04 |
| 9,796,442 B1* | 10/2017 | Kalmus | ...................... | B60J 1/06 |
| 2003/0011166 A1 | 1/2003 | Wargin | | |
| 2005/0161970 A1 | 7/2005 | Willey | | |

* cited by examiner

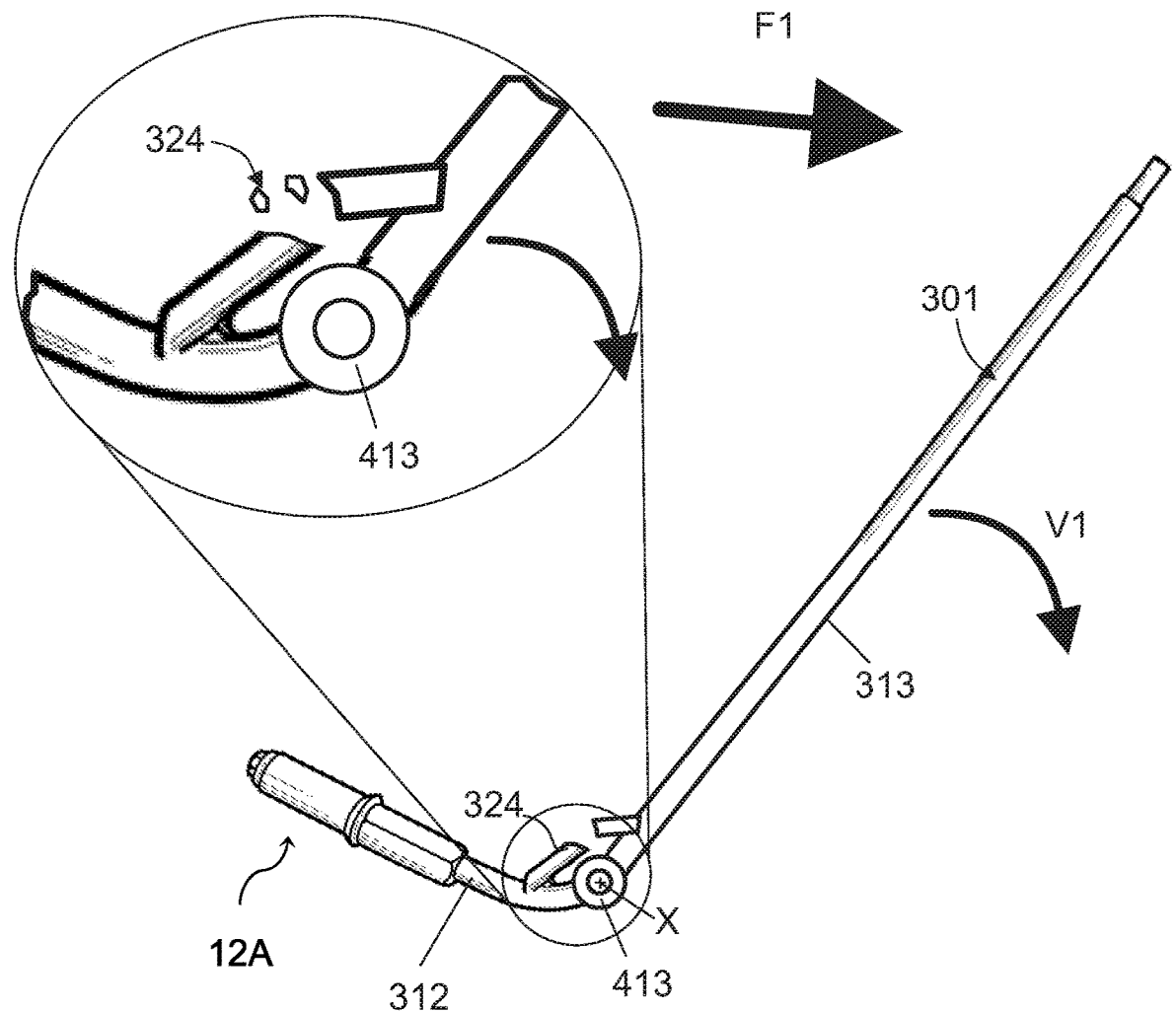

SAFETY WINDSCREEN ASSEMBLY

TECHNICAL FIELD

The present description relates to the technical field of windscreen assemblies for vehicles and more preferably for motor vehicles. More in particular, the present description concerns a safety windscreen assembly.

BACKGROUND

Equipping a motor vehicle, in particular a scooter, with a windscreen panel to shield the driver from wind, rain and atmospheric agents is well known.

Commonly, the windscreen panel is attached to the vehicle by means of a pair of support arms which are respectively connected to the vehicle handlebar and to the windscreen panel.

In case the vehicle suddenly stops, for example, in the event of a traffic accident, and the driver is thrown forwards towards the windscreen panel, he/she may get injured by hitting against the windscreen panel and/or against the support arms thereof. Being the support arms arranged vertically, these may be very dangerous and represent actual blunt elements.

To reduce the risk and the entity of physical damage to the driver, solutions are known which provide for a forward tilting of the windscreen panel once the latter is hit by the driver.

For example, document EP 0060807 describes a windscreen assembly in which the windscreen panel, following the impact with the driver thrown from the vehicle, tilts forward, detaching itself from a pair of upper support arms. To prevent the windscreen panel from completely detaching from the motorcycle, a pair of lower support arms are provided to which the windscreen remains connected. The windscreen assembly described in such document has a relatively complex structure in that it has upper support arms, lower support arms and attachment systems for attaching the arms to the windscreen panel. Furthermore, following the forward tilting of the windscreen panel, the driver may impact against the upper support arms, which, as discussed above, may reduce the effectiveness of the accessory safety devices with which the driver of the vehicle may be equipped.

Furthermore, the windscreen panel may hit against the motorcycle fork, which may damage the windscreen panel.

Document U.S. Pat. No. 4,087,110 describes a windscreen assembly solution in which the windscreen panel is constrained to the motorcycle fairing. Such solution is not applicable to a windscreen assembly in which the windscreen panel is attached to the motorcycle by means of support arms.

Other solutions are described in documents U.S. Pat. No. 6,752,447, US 2011/101724. The latter describes a windscreen in which the height and inclination of the windscreen panel may be adjusted so as to obtain the desired shielding effect.

All the above windscreen assembly solutions have a drawback. To ensure the safety of the user, whenever the windscreen assembly suffers a collision such to change the original configuration thereof, the need is felt to make it non-reusable, if not upon a certified replacement of at least one of the parts thereof ensuring complete functionality. Thereby, it is ensured that the windscreen assembly may not be reused simply by mounting the various parts back together.

BRIEF SUMMARY

The present description provides an alternative safety windscreen assembly solution which is capable of solving the drawback described above with reference to the background art.

The disclosure further provides a vehicle as described herein.

BRIEF DESCRIPTION OF THE DRAWINGS

The disclosure will become more apparent from the following detailed description of the embodiments thereof, made by way of explanation and, therefore, by no means, by way of limitation, in relation to the accompanying drawings, in which:

FIG. 5 shows a perspective view of the support arm of FIG. 4 in a second configuration;

FIG. 6 shows an enlarged view of a portion of the support arm of FIG. 5.

DETAILED DESCRIPTION

Figure 1:
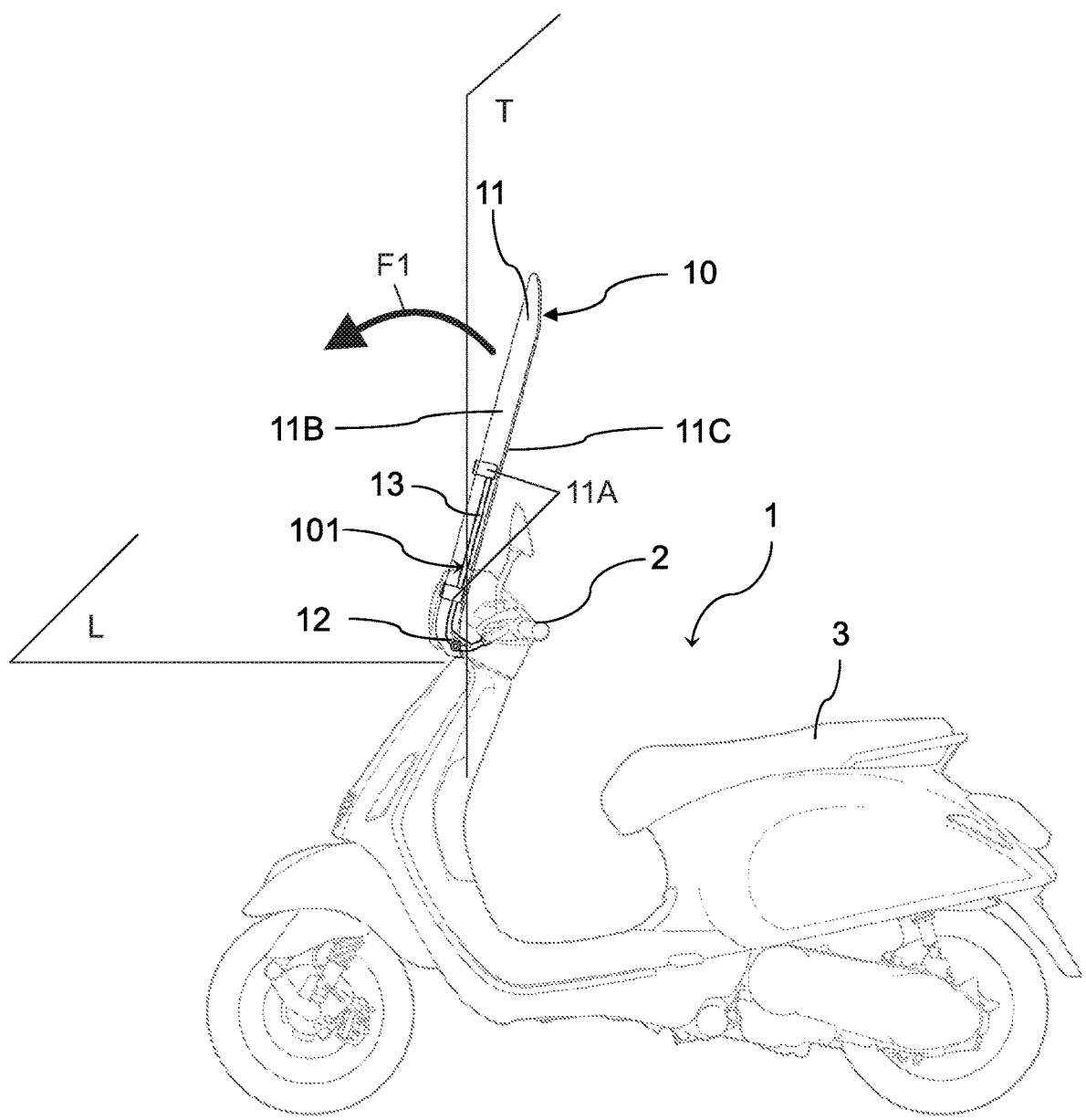
FIG. 1 is a diagrammatic view of a motorcycle equipped with a safety windscreen assembly according to the present disclosure, such windscreen assembly being shown in a first configuration.

In the accompanying Figures, the same or similar elements will be indicated with the same reference numerals.

With reference to FIG. 1, a motorcycle 1 is shown provided with a safety windscreen assembly 10, according to the present disclosure.

In this regard, it should be noted that the teachings of the present description may be extended to a safety windscreen assembly applicable to other types of motor vehicles provided with a steering handlebar and with a saddle astride which the driver of the vehicle may sit.

Preferably, the teachings of the present description may be extended to safety windscreen assemblies applicable to motor vehicles with two or more wheels, and more preferably having two, three or four wheels.

The safety windscreen assembly 10 comprises a windscreen panel 11 and at least one support arm 101 to support the windscreen panel 11. The windscreen panel 11 is a transparent panel such as to allow the driver of the motorcycle 1 to see, in use, through such panel 11. Preferably, the windscreen panel 11 is a panel made of polymethacrylate or of polycarbonate, more conveniently of polymethacrylate slabs or of polycarbonate slabs, which has a first face 11B with a slightly cambered curvature and a second face 11C facing towards the saddle 3.

In the example, the windscreen assembly 10 preferably comprises two support arms 101. In a preferred embodiment, the support arms 101, 301 are substantially equal to each other, arranged so as to equally support the loads of the windscreen panel 11. Since, as discussed above, in the example, the windscreen assembly 10 comprises two support arms 101, 301 substantially identical to each other, below, the structure of a single support arm 101, 301 will be described in detail.

In particular, each support arm 101, 301 comprises a first arm portion 12, 312 having, for example, and not by way of limitation, a generally hook-like shape, configured to be attached to the handlebar of the motorcycle 1, or to the front shield of the motorcycle 1, and a second arm portion 13, 313, for example, shaped as a straight rod, which is attached or attachable to the windscreen panel 11. Preferably, the first arm portion 12, 312 comprises at least one attachment member 12A to removably attach the support arm 101, 301 to the motorcycle 1, and more preferably to the handlebar 2 of the motor vehicle. Preferably, the at least one attachment member 12A comprises, for example, an attachment device as described in the U.S. Pat. No. 8,469,624 in the name of the Applicant.

The second arm portion 13, 313 is attached to the windscreen panel 11. Preferably, the second arm portion 13, 313 is attached to the windscreen panel removably, for example, by means of one or more anchor blocks 11A integral with the windscreen panel 11. Each anchor block 11A has a through opening through which the second arm portion 13 is inserted. The blocks 11A comprise a locking system, commonly of the screw type, to removably lock the second arm portion 13, 313 once the latter has been inserted into the through opening. Thereby, it is possible to make the second arm portion 13, 313 integral with the anchor block 11A and consequently with the windscreen panel 11. Therefore, the windscreen panel 11 is firmly connected only to the second arm portion 13, 313.

The anchor blocks 11A are known per se and will therefore not be described further in detail. In the example the second arm portion 13 of each of the support arms 101 is attached to two anchor blocks 11A.

Figure 2:
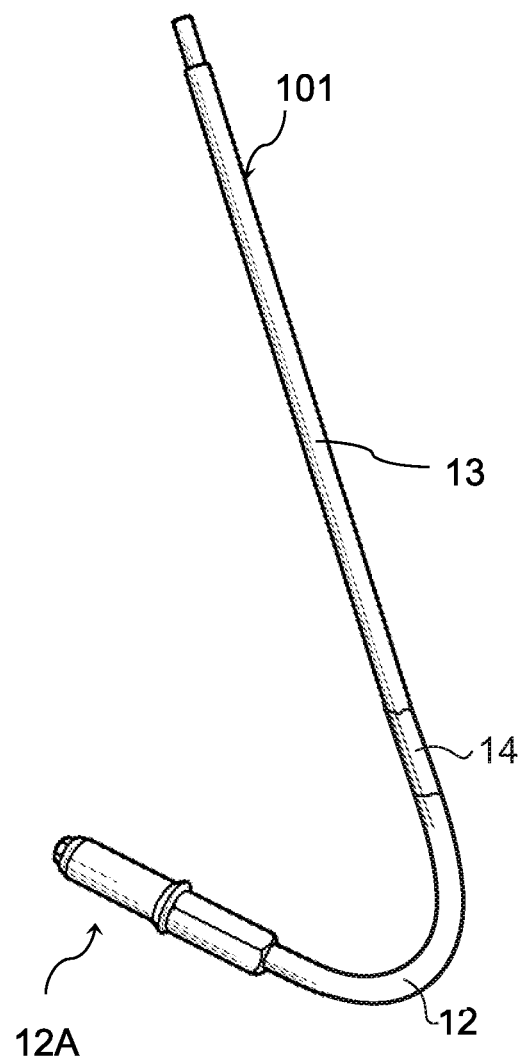
FIG. 2 shows a perspective view of a support arm of the windscreen assembly of FIG. 1.
Figure 3:
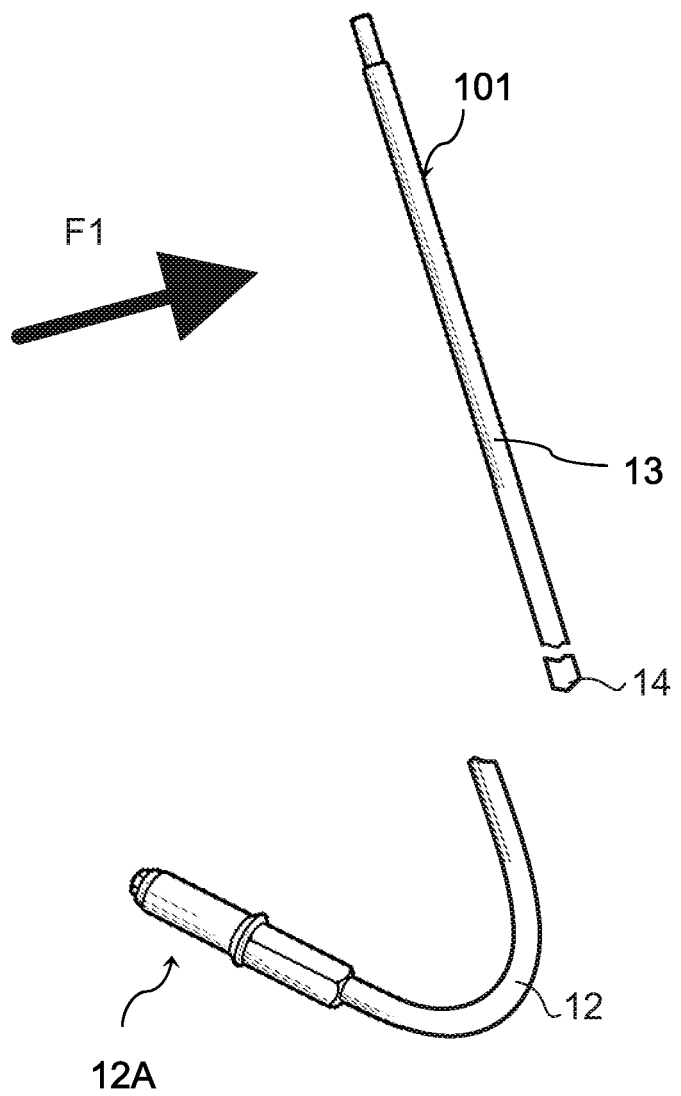
FIG. 3 shows a perspective view of the support arm of FIG. 2 in a second configuration.

With reference, for example, to FIGS. 2 and 3, in a first embodiment, the support arm 101 comprises a sacrificial coupling element 14 to couple the second arm portion 13 with the first arm portion 12. Thereby, the second arm portion 13 is adapted to pass in a breaking configuration with respect to the first arm portion 12 when the windscreen panel 11 is hit by a predetermined impact force F1 higher than a threshold value.

Said sacrificial element has a breaking load lower than the first and second arm portion 12, 13. In practical terms, in the case of relative flexion of the support arm 101, i.e., of a change in the angle or position of the first arm portion 12 with respect to said second arm portion 13, the sacrificial coupling element 14 irreversibly breaks, keeping the arm portions 12, 13 intact.

In particular, as shown in FIG. 3, the breaking configuration sees the second arm portion 13 detached, upon breaking, from the first arm portion 12. To emphasize the concept, the sacrificial element 14 is shown disconnected from both the first and the second portions 12, 13. In any case, the sacrificial element 14 may, following the breaking thereof, remain connected at least partially, to one or both the arm portions 12, 13.

Figure 4:
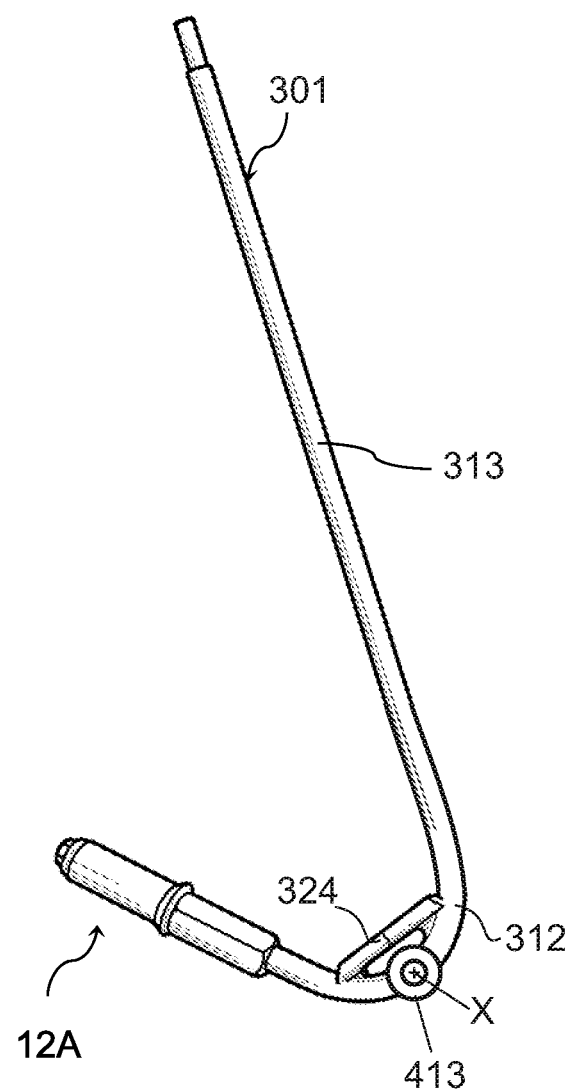
FIG. 4 shows a perspective view of a support arm of the windscreen assembly in a second embodiment, in which the support arm is shown in the first configuration.

In a second embodiment shown in FIGS. 4 and 5, the support arm 301 comprises a first arm portion 312 and a second arm portion 313 pivotally connected to each other by means of a hinge 413. A sacrificial coupling element 324 extends as a connection between the first arm portion 312 and the second arm portion 313 over the hinge 413. In particular, the sacrificial element 324 is connected diagonally between the first 312 and the second arm portion 313 above the hinge 413.

In the breaking configuration, as shown in FIG. 5 and in FIG. 6, the second arm portion 313 pivots about a rotation axis X of the hinge 413 from a first angular position to a second angular position in a first direction V1 when the windscreen panel hit by the force F1 causes the breaking load to be exceeded and the consequent braking of the sacrificial coupling element 324.

In the first angular position, the second arm portion 313 lies on a plane T transversal with respect to the forward direction of the motor vehicle 1. In the second angular position, the second arm portion 313 lies on a plane L longitudinal with respect to the forward direction of the motor vehicle 1, as diagrammatically shown in FIG. 1.

In other words, the second arm portion 313 pivots by an angle generally from about 100° to about 110° when it passes from the first angular position to the second angular position. In general, considering the safety windscreen assembly 10 mounted on the motorcycle 1 in a normal use condition, in the first angular position the second arm portion 313 is preferably substantially vertical, while in the second angular position the second arm portion 313 is preferably horizontal or substantially horizontal.

In a preferred embodiment, the sacrificial coupling element 14, 324 is made of a material with a determined breaking load, which defines the threshold value beyond which the support arm 101, 301 moves into the breaking configuration. The windscreen panel 11, therefore, detaches itself or pivots about the hinge 413, so as to make the support arms 101, 301 and the ends thereof face away from the driver falling forward.

The breaking load is preferably a shear stress breaking load, in the first embodiment of the sacrificial element 14, and a tensile breaking load in the second embodiment of the sacrificial element 314.

In general, the breaking load is a function of the geometry of the sacrificial element 14, 314, of the position thereof and of the geometry of the windscreen.

The sacrificial element 14, 314 is configured so as not to break, preferably in case of compression, if the stress resulting from the friction of the air against the windscreen 10 during the advancement of the motorcycle 1 involves said sacrificial element 14, 314.

To quantify the breaking load, a pendulum test was hypothesized in which a mass of 50 Kg hits against the windscreen panel at a speed of about 25 Km/h.

In the light of these values, the breaking load, expressed as the threshold energy determining the breaking of the sacrificial element, is from 100 Nm to 800 Nm, in particular from 160 Nm to 750 Nm.

Having described the structure of a safety windscreen assembly according to the present description, an mode of employing such assembly with reference to the embodiment shown in the accompanying Figures is now described by way of explanation and not by way of limitation.

The safety windscreen assembly 10 in the configuration of FIG. 1 is now to be considered, in which the windscreen assembly 10 is mounted on the motorcycle 1 and where the second arm parts 13, 313 of the support arms 101, 301 are in the first angular position.

Starting from such configuration, assuming that the second windscreen panel face 11C of the windscreen panel 11 is hit by a predetermined impact force, the windscreen panel 11 will pass into a breaking configuration, when the impact force exceeds the threshold value. In a first case, the second arm portion 13 detaches itself from the first portion 12, in a second case, the first arm portion 313 pivots in the direction of the arrow V1, with respect to the first arm portion 312. This may happen, for example, in case, due to a traffic accident, the driver of the motorcycle 1 is thrown from the seat 3 against the windscreen assembly 10.

The adoption of a sacrificial element 14, 314 allows to ensure a safe employment of the windscreen itself. Following a breaking, to restore the windscreen, where possible, the sacrificial element shall be replaced, according to a specific process by, for example, a contracted dealer. Thereby, operation is ensured to be in compliance with specific calibration parameters, preventing the windscreen from being restored independently, without observing the calibration parameters; this latter aspect may compromise the correct operation, and therefore safety for the user.

Being the sacrificial element 14, 314 at sight, a user may clearly distinguish the integrity thereof.

The above description of the embodiments of the disclosure is capable of showing the disclosure from the conceptual point of view so that others, using the background art, may modify and/or adapt in various applications such specific embodiments without further research and without departing from the inventive concept, and, therefore, it is meant that such adaptations and/or modifications will be considered as equivalent to specific embodiments. The means and the materials used to carry out the various functions described may be of a various nature without departing from the scope of the disclosure. It is understood that the expressions or the terminology have a purely descriptive and, therefore, not limitative scope.

The invention claimed is:

1. A safety windscreen assembly comprising:
a windscreen panel;
a support arm to support the windscreen panel, the support arm comprising a first arm portion configured to be attached to a motor vehicle, and a second arm portion attached to the windscreen panel, said motor vehicle being a vehicle provided with a steering handlebar and with a seat astride which a driver may sit;
a sacrificial coupling element to couple the second arm portion with the first arm portion so that the second arm portion is adapted to pass in a breaking configuration with respect to said first arm portion when said windscreen panel is pushed forward by an impact force higher than a predetermined threshold value;
wherein the first arm portion and the second arm portion are pivotally connected to each other by means of a hinge, and wherein said sacrificial coupling element connects the first arm portion and the second arm portion together over said hinge.

2. A safety windscreen assembly according to claim 1, wherein in said breaking configuration the second arm portion is detached, upon breaking, from the first arm portion.

3. A safety windscreen assembly according to claim 1, wherein said sacrificial coupling element is made of a material with a determined breaking load, defining said threshold value.

4. A safety windscreen assembly according to claim 2, wherein said breaking load is a shear stress breaking load.

5. A safety windscreen assembly according to claim 1, wherein said breaking load is comprised between 100 Nm and 800 Nm, in particular, between 160 Nm and 750 Nm.

6. A safety windscreen assembly according to claim 1, wherein in the breaking configuration the second arm portion is adapted to rotate about a rotation axis of said hinge from a first angular position to a second angular position according to a first direction, when said windscreen panel is pushed forward by said force and said breaking load is exceeded, determining the breaking of said sacrificial coupling element.

7. A safety windscreen assembly according to claim 1, wherein, in the first angular position, said second arm portion lies on a transversal plane with respect to the forward direction of said motor vehicle, and, in the second angular position, said second arm portion lies on a longitudinal plane which is in the same direction of the forward direction of said motor vehicle.

8. A motor vehicle provided with a steering handlebar and with a seat astride which a vehicle driver may sit, said motor vehicle comprising a windscreen assembly as defined in claim 1.

\* \* \* \* \*